(12) United States Patent  (10) Patent No.: US 8,052,543 B2
Choi  (45) Date of Patent: Nov. 8, 2011

(54) ANALYSIS SYSTEM OF GOLF BALL AND HEAD INFORMATION USING LASERS AND 4 AXIS LIGHT SENSING

(76) Inventor: Seung Whan Choi, Daejeon (KR)

( * ) Notice: Subject to any disclaimer, the term of this patent is extended or adjusted under 35 U.S.C. 154(b) by 909 days.

(21) Appl. No.: 11/913,399

(22) PCT Filed: May 3, 2006

(86) PCT No.: PCT/KR2006/001666
§ 371 (c)(1),
(2), (4) Date: Nov. 1, 2007

(87) PCT Pub. No.: WO2006/118422
PCT Pub. Date: Nov. 9, 2006

(65) Prior Publication Data
US 2008/0153613 A1    Jun. 26, 2008

(30) Foreign Application Priority Data
May 3, 2005    (KR) .......................... 10-2005-0037209

(51) Int. Cl.
*A63B 57/00*    (2006.01)
(52) U.S. Cl. ......... 473/407; 473/131; 473/218; 473/409
(58) Field of Classification Search .................. 473/156, 473/407, 131, 218, 409; 73/12.01; 702/141
See application file for complete search history.

(56) References Cited

U.S. PATENT DOCUMENTS

| | | | | |
|---|---|---|---|---|
| 5,348,304 | A * | 9/1994 | Meade | 473/409 |
| 5,464,220 | A * | 11/1995 | Hansen et al. | 473/218 |
| 5,694,340 | A * | 12/1997 | Kim | 702/141 |
| 5,803,823 | A * | 9/1998 | Gobush et al. | 473/223 |
| 6,095,928 | A * | 8/2000 | Goszyk | 473/222 |
| 6,669,575 | B1 * | 12/2003 | Marlette | 473/270 |
| 7,494,430 | B2 * | 2/2009 | Choi | 473/407 |
| 2003/0209053 | A1 * | 11/2003 | McNamara et al. | 73/12.01 |
| 2006/0040755 | A1 * | 2/2006 | Choi | 473/131 |

FOREIGN PATENT DOCUMENTS

| | | |
|---|---|---|
| JP | 11-206942 | 8/1999 |
| KR | 10-2002-0059562 | 7/2002 |
| KR | 10-2003-0027143 | 4/2003 |
| KR | 10-2003-0077379 | 10/2003 |
| KR | 10-2003-0085766 | 11/2003 |

* cited by examiner

*Primary Examiner* — Masud Ahmed
(74) *Attorney, Agent, or Firm* — LRK Patent Law Firm (57) ABSTRACT

An analysis system of golf ball and club head data using lasers and 4-axis light sensing is provided, which includes a horizontal sensor array including a plurality of light sensors arranged in straight lines, the horizontal sensor array receiving light from a light source; a vertical sensor array installed to protrude from the floor at a perpendicularly offset angle, the vertical sensor array receiving a laser beam from a laser; a control unit deriving position coordinates of the golf ball in space using data of the silhouette of the golf ball detected by the horizontal and vertical sensor arrays, and calculating ball speed, club head speed, a ball directional angle, a ball launch angle, a club head path, a ball quality, and a flight distance, using the position coordinates of the golf ball; and a display unit displaying the calculated values on a screen under control of the control unit.

9 Claims, 8 Drawing Sheets

BALL TRAVEL DIRECTION

THIRD HORIZONTAL SENSOR ARRAY    SECOND HORIZONTAL SENSOR ARRAY    FIRST HORIZONTAL SENSOR ARRAY

ANALYSIS SYSTEM OF GOLF BALL AND HEAD INFORMATION USING LASERS AND 4 AXIS LIGHT SENSING

CLAIM OF PRIORITY

This application claims priority under 35 USC 371 to International Application No. PCT/KR2006/001666, filed on May 3, 2006, which claims priority to Korean Patent Application No. 10-2005-0037209, filed on May 3, 2005, each of which is incorporated by reference in its entirety.

TECHNICAL FIELD

The present invention relates to an analysis system of golf ball and head information using lasers and 4-axis light sensing. The system detects the silhouette of a golf ball and the silhouette of a club head as the golf ball is struck in a golf practice range, uses the detected data to determine ball speed, club head speed, a ball direction and launch angle, a club head path, a ball quality, and a flight distance, and provides the data on a screen.

BACKGROUND ART

The number of people enjoying golf in South Korea has reached 2 million and is increasing among the general population due to the success of Korean golfers such as Seri Park and Mihyeon Kim in the LPGA circuit and an increase in air time that golf is receiving on both on-air and cable TV. Furthermore, with the implementing of a five-day work week by the government, more people are participating in golf. Golf, a prestigious, nature-bound activity that provides physical exercise and opportunities to socialize and conduct business, is expanding its base.

Most golf enthusiasts play on golf courses and practice their swings at practice and driving ranges. There are several tens of golf courses and thousands of indoor and outdoor golf practice ranges in Korea. Those who become immersed in golf strive ceaselessly to improve their game and invest much time and money. Beginners practice their swings at driving ranges and other facilities. Further, as they become more advanced, they focus on the intricacies of the swing. Improvement in one's golf skill is manifested in a reduced number of strokes when playing a round on a golf course. Thus, not only beginners, but also advanced players frequently practice their swings at golf practice ranges in preparation for playing on a course. The goal of practicing one's swing is to implement correct posture and hone one's ability to drive the ball to a desired location. The ultimate goal is to reduce the number of strokes in one's game on the field. Advanced players are interested in which direction the spin of a ball such as hook or slice occurs after the ball travels a certain distance.

Some driving ranges use a light sensor installed on the floor to analyze swings. However, with a sensor installed only on the floor, the launch angle of the ball cannot be directly measured.

When considering the every golfer should swing at the optimal swing speed and launch angle to achieve maximum flight distances, analysis of the launch angle of the ball is important. However, a sensor installed only in the floor cannot measure movement of the club and ball in terms of height within a three-dimensional space, so that the sensor is inaccurate.

DISCLOSURE OF INVENTION

Technical Problem

To solve the above problem, the present invention provides an analysis system of golf ball and club head data using lasers and 4-axis light sensing that is capable of providing data on ball speed, projected flight distance, impact on the club head, precision of the club head swing angle, lean of the stroke to the left or right, etc. to a golfer practicing a swing in an indoor/outdoor driving range or other practice facility.

The present invention also provides an analysis system of golf ball and club head data using lasers and 4-axis light sensing that is capable of detecting the flight of a golf ball after the ball is struck in a practice range, calculating ball speed, flight distance, direction, initial angle, trajectory, landing point, etc., displaying this data in terms of an image and numbers on a screen, and providing a detailed, three-dimensional graph showing the trajectory of the ball against a background image of a golf course, so that the user who hit the ball can easily see the analysis results.

Technical Solution

According to an aspect of the present invention, there is provided an analysis system of golf ball and club head data using lasers and 4-axis light sensing, the analysis system including: a horizontal sensor array installed on a floor and including a plurality of light sensors arranged in straight lines a predetermined distance apart from each other, the horizontal sensor array receiving light from a light source installed thereabove so as to detect the silhouette of a golf ball or a club head according to movements of the golf ball or club head; a vertical sensor array installed to protrude from the floor at a perpendicularly offset angle, the vertical sensor array receiving a laser beam from a laser installed to the rear thereof so as to detect the silhouette of the golf ball when the golf ball passes through the laser beam; a control unit deriving position coordinates of the golf ball in space using data of the silhouette of the golf ball detected by the horizontal and vertical sensor arrays, and calculating ball speed, club head speed, a ball directional angle, a ball launch angle, a club head path, a ball quality, and a flight distance, using the position coordinates of the golf ball; and a display unit displaying the calculated values on a screen according to the control by the control unit.

Advantageous Effects

An advantage of the analysis system of golf ball and club head data using lasers and 4-axis light sensing according to the present invention is that it is capable of providing data on ball speed, projected flight distance, impact on the club head, precision of the club head swing angle, lean of the stroke to the left or right, etc. to a golfer practicing a swing in an indoor/outdoor driving range or other practice facilities.

Another advantage of the analysis system of golf ball and club head data using lasers and 4-axis light sensing is that it is capable of detecting the flight of a golf ball after it is struck in a practice range, calculating ball speed, flight distance, direction, initial angle, trajectory, landing point, etc., displaying this data in terms of an image and numbers on a screen, and providing a detailed, three-dimensional graph showing the trajectory of the ball against a background image of a golf course, so that the user who hit the ball can easily see the analysis results.

BEST MODE FOR CARRYING OUT THE INVENTION

Hereinafter, preferred embodiments of a golf ball and club head data analysis system using lasers and 4-axis light sensing according to the present invention will be described in detail with reference to the accompanying drawings.

Figure 1:
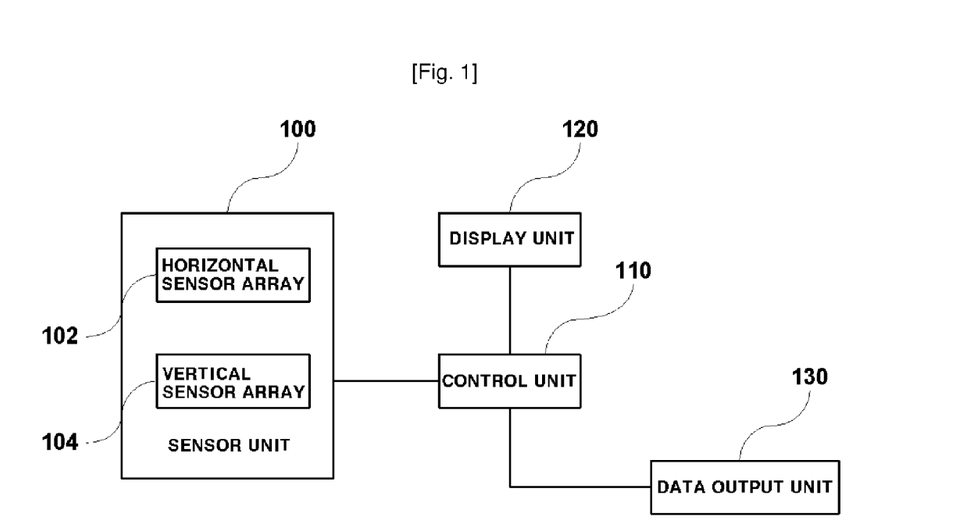
FIG. 1 is a schematic block diagram showing the configuration of an analysis system of golf ball and club head data using lasers and 4-axis sensing according to the present invention.
Figure 2:
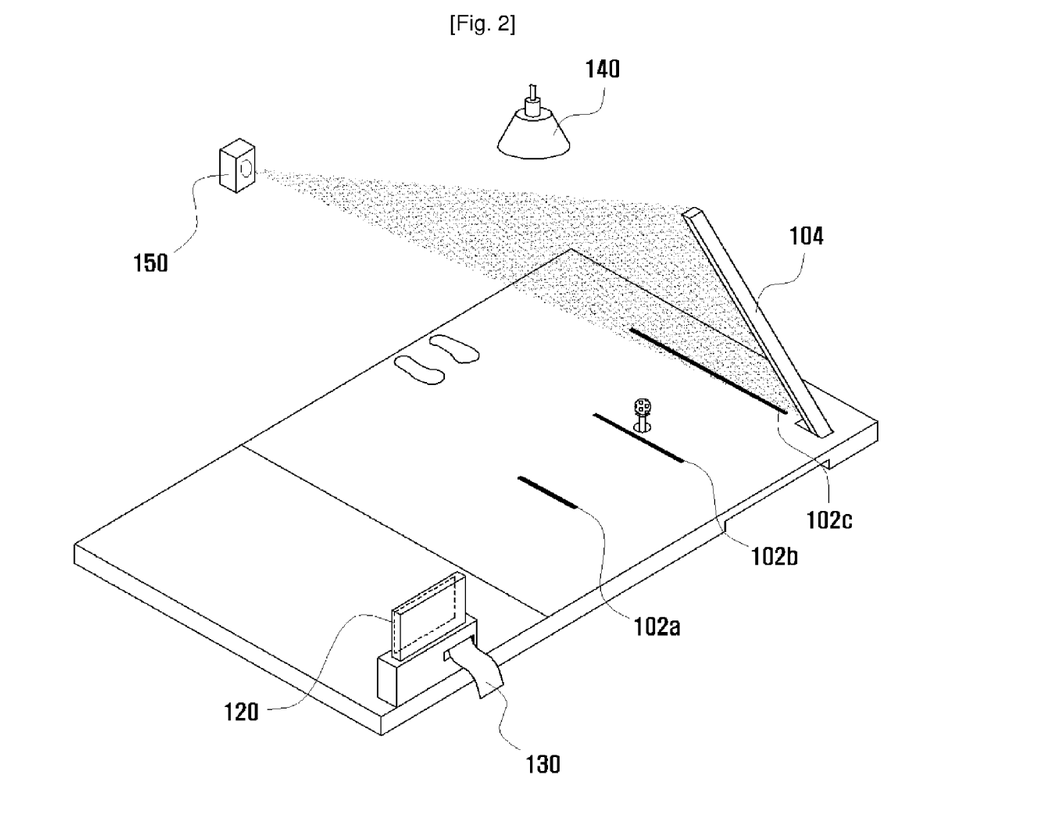
FIG. 2 is a perspective conceptual view of an installed analysis system of golf ball and club head data using lasers and 4-axis sensing according to the present invention.
Figure 3:
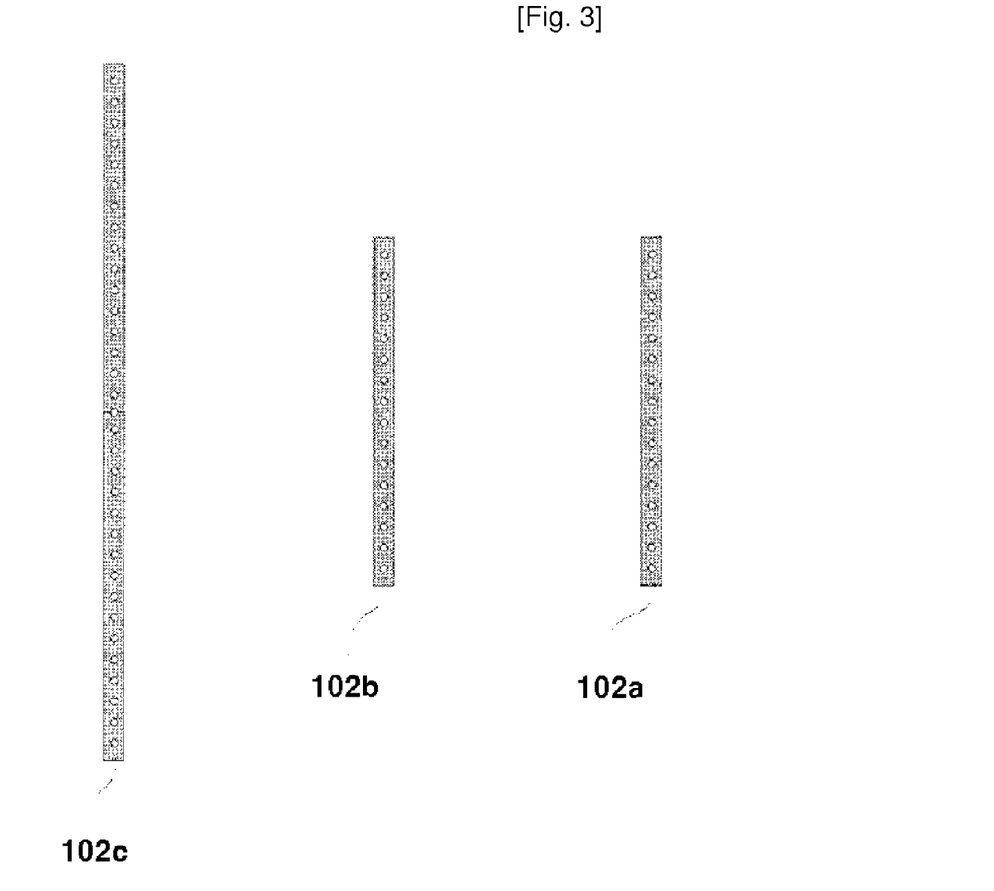
FIG. 3 is a plan view of horizontal sensors according to the present invention.
Figure 4:
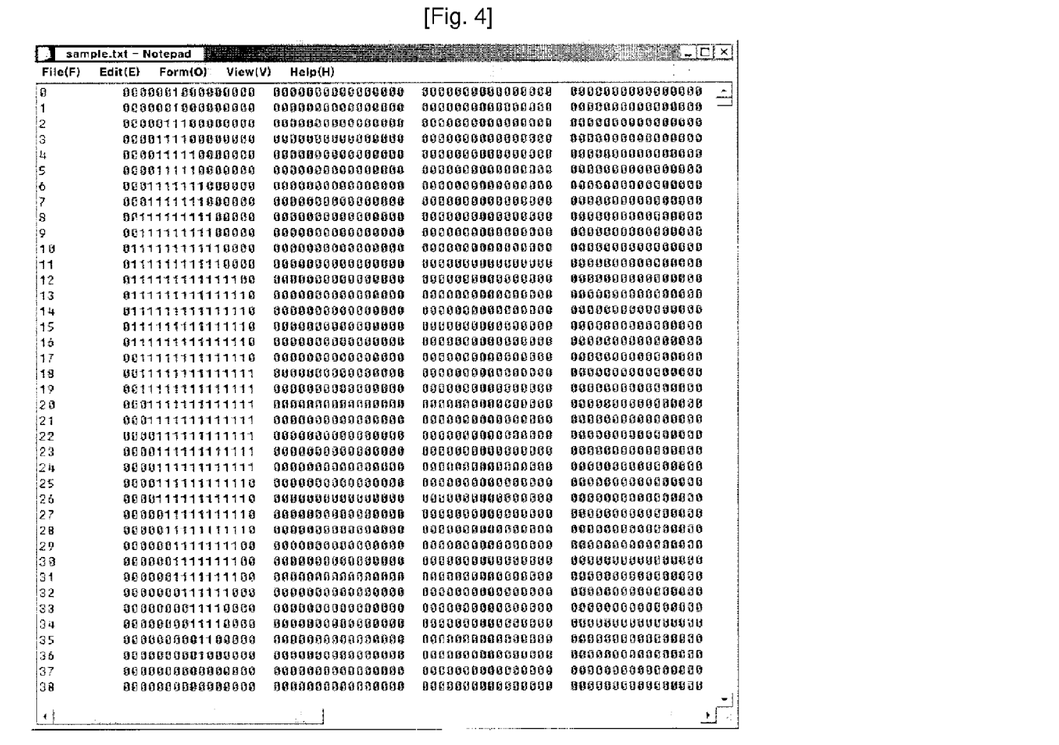
FIG. 4 is an exemplary diagram of silhouette data depicted as binary data, according to the present invention.
Figure 5:
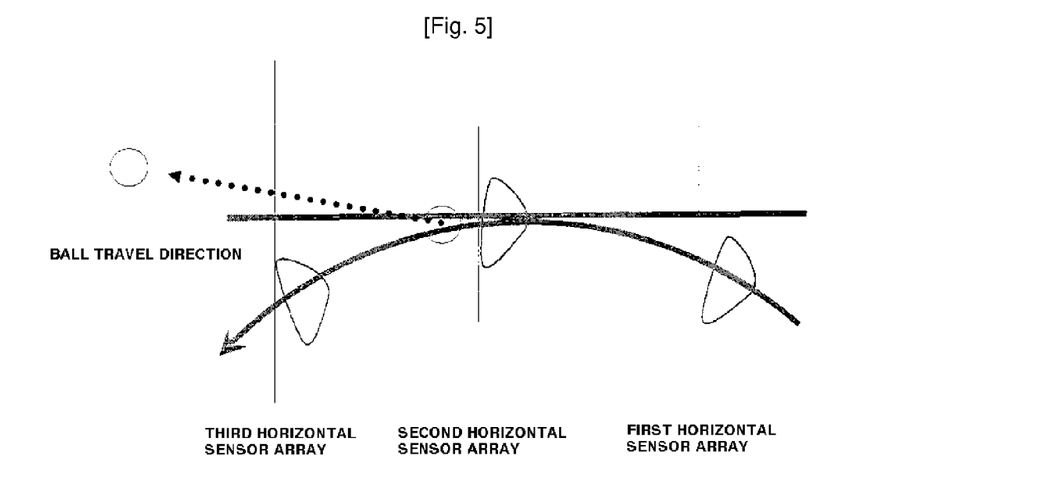
FIG. 5 is a diagram showing the swing path of a club head, according to the present invention.
Figure 6:
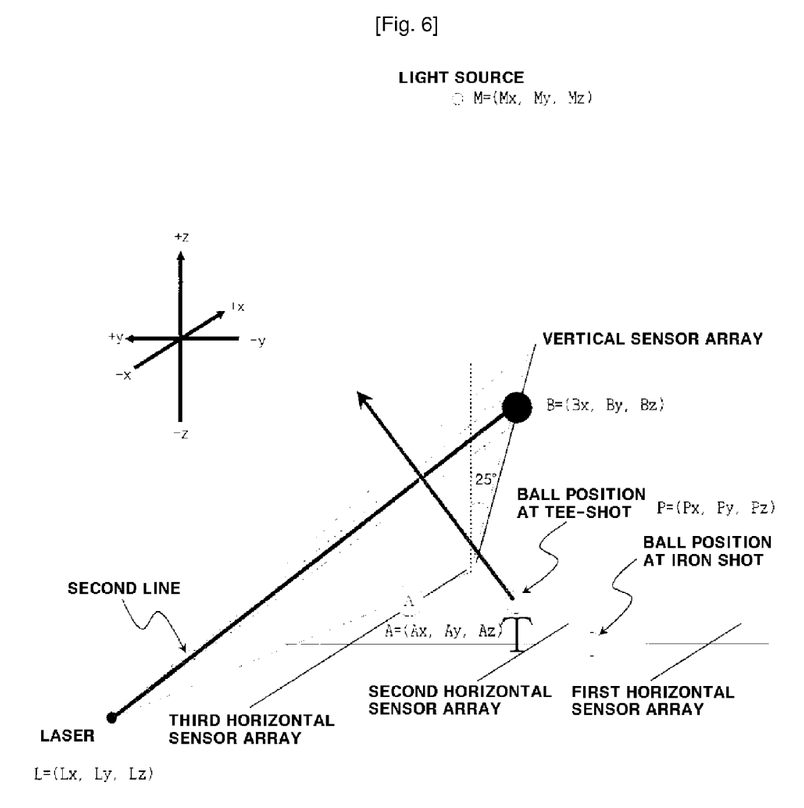
FIG. 6 is a diagram showing direction and launch angles of a ball, according to the present invention.

FIG. 1 is a schematic block diagram showing the configuration of an analysis system of golf ball and club head data using lasers and 4-axis sensing according to the present invention; FIG. 2 is a perspective conceptual view of an installed analysis system of golf ball and club head data using lasers and 4-axis sensing according to the present invention; FIG. 3 is a plan view of horizontal sensors according to the present invention; FIG. 4 is an exemplary diagram of silhouette data depicted as binary data, according to the present invention; FIG. 5 is a diagram showing the swing path of a club head, according to the present invention; FIG. 6 is a diagram showing direction and launch angles of a ball, according to the present invention; and FIGS. 7 through 15 are diagrams for explaining a method of determining a ball quality according to the present invention.

Referring to FIGS. 1 and 2, a golf ball and club head data analysis system using lasers and 4-axis light sensing according to the present invention includes a sensor unit 100, a control unit 110, a display unit 120, and a data output unit 130.

The sensor unit 100 includes a horizontal sensor array 102 installed in the floor and a vertical sensor array 104 with an inclined portion protruding upward in order to measure a launch angle.

Referring to FIG. 3, the horizontal sensor 102 includes a first, second, and third horizontal sensor arrays 102a, 102b, and 102c.

The first through third horizontal sensor arrays 102a, 102b, and 102c are each formed of a single printed circuit board (PCB) having a plurality of light sensors arranged in straight lines. That is, the first horizontal sensor array 102a is installed a predetermined distance to the right from the position where the golf ball is launched, the second horizontal sensor array 102b is installed a predetermined distance from the first horizontal sensor array 102a, and the third horizontal sensor array 102c is installed a predetermined distance from the second horizontal sensor array 102b. Here, the coordinates of the respective sensors within the first second and third horizontal sensor arrays 102a, 102b, and 102c are predetermined.

The light sensors include laser diodes, infrared light emitting diodes, photodiodes, and photo transistors.

The first to third horizontal sensor arrays 102a, 102b, and 102c receive light from a light source 140 disposed thereabove, and detect the silhouette of an object as it passes through the light layer. Here, the first to third horizontal sensor arrays 102a, 102b, and 102c are spaced a predetermined distance apart from each other, so that there are temporal intervals when the respective sensor arrays detect the silhouette of the object. These temporal intervals are used to determine the speed of a ball or a club head.

The first to third horizontal sensors 102a, 102b, and 102c transmit the silhouette detection data to the control unit 110. Here, the silhouette detection data is displayed as binary data, as depicted in FIG. 4, with '1' signifying a detected region of silhouette and '0' signifying an undetected region of silhouette.

FIG. 4 depicts binary data obtained in 4 columns, where in the first column, '1' depicts the silhouette of a club passing by in indexes 0-36. At the same time, because no object passes over the remaining rows of sensors, they are marked with a '0' value.

The silhouette data of a club passing by each row of sensors is divided, so that the approach path of the club head and its disposition upon impact can be depicted as in a digital photograph, as shown in FIG. 5.

Specifically, the first horizontal sensor array 102a detects a first club head silhouette, the second horizontal sensor array 102b detects a second club head silhouette, and the third horizontal sensor array 102c detects a third club head silhouette.

Thus, the continuously detected data on the first to third club head silhouettes are used to determine the approach path of the club head and its disposition upon impact.

Further, these continuously detected digital data can be analyzed to determine ball speed, club head speed, etc.

When the three horizontal sensor arrays 102a, 102b, and 102c are installed in the floor, the club head passes over the sensor arrays, and its silhouette can be replayed to determine if the approach path of the club head is an outside-inside, inside-inside, or an inside-outside path. The first to third horizontal sensor arrays 102a, 102b, and 102c can all capture the ends of the club silhouette so that an imaginary curve passing through three points can be derived, and the curvature of the curve can be calculated to reconstruct the trajectory path of the club head before and after it strikes the ball.

The importance of the data on the silhouette of the club head detected by the second horizontal sensor 102a is the most important of the data provided by the three horizontal sensors because it can show which part of the ball the club hits at impact. The first to third horizontal sensors 102a, 102b, and 102c show the silhouette of the club head so that it can not only be used to analyze the swing, but can also be used to measure the approach path of the club head and the degree in which the club face is open or closed so that the ball quality can be determined. Furthermore, the difference between the path of the club and the ball, the area of the club which strikes the ball and other factors can be analyzed so as to be reflected into the ball quality, for a more detailed analysis.

The vertical sensor array 104 receives light emitted from a laser 150 disposed behind the equipment, and detects the silhouette of the ball or the club head as it passes through the laser beam. The silhouette data is detected to analyze the movement of the ball and the club. Here, the vertical sensor array 104 is disposed at a leaning angle to expand the detecting area of the ball.

The silhouette data detected by the vertical sensor array 104 allows measurement of the launch angle and space velocity of the ball, contributing to a more accurate calculation of flight distance and flight simulation of the golf ball.

During a golf swing, the movement of the club head and the ball can be detected by arranging multiple elongated rows of sensors that respond to light in the impact zone, and emitting light from a light source to the sensors. Here, when the golf club and ball pass between the light source and the sensors, the silhouettes created by the club and ball momentarily prevent light from reaching the sensors, so that paths and speeds of the ball and club can be calculated.

The control unit 110 receives silhouette data from the horizontal sensor array 102 and the vertical sensor array 104, and uses the data to obtain the ball speed, club head speed, ball direction and launch angle, and flight distance.

That is, the control unit 110 receives continuous silhouette digital data (silhouette data) from the horizontal sensor array 102 and digital data (silhouette data) from the vertical sensor array 104, and interprets the data to derive ball speed and club head speed.

First, the vertical sensor array 104 measures ball speed from a tee shot by using a time during which the ball passes.

$$T = n/f \qquad \text{Equation 1}$$
$$BallSpeed = \frac{S}{T}$$

Here, T is time, f is a sampling frequency, n is a ball silhouette block index number of a ball passing the sensors, S is a value obtained by adding the diameter of the golf ball and the width of the actual measuring region of the measuring device.

Figure 16:
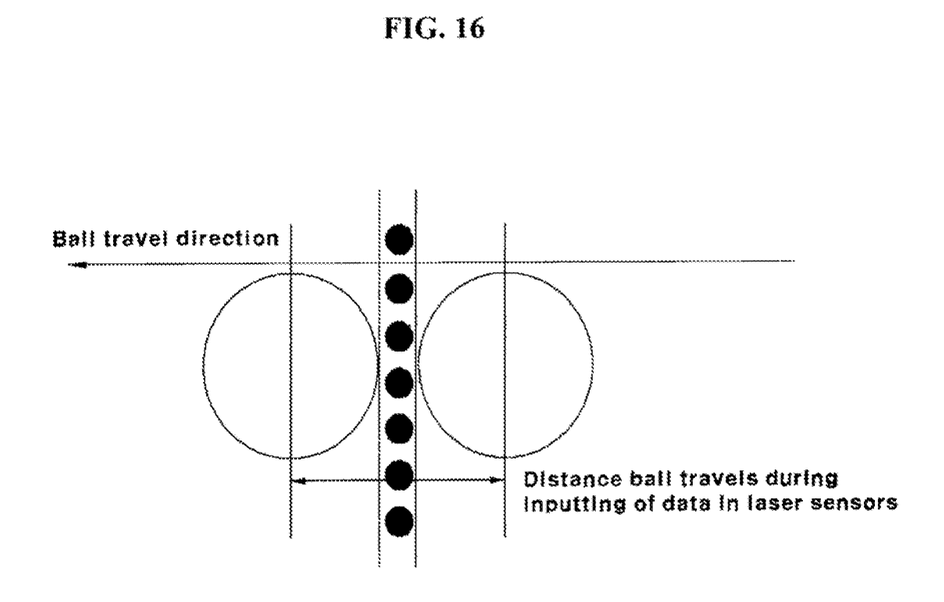
FIG. 16 is a diagram showing the process of calculating the ball speed from a tee shot.

FIG. 16 is a diagram showing the process of calculating ball speed from a tee shot.

In the case of an iron shot, using vectors $\vec{X}$ and $\vec{Y}$ explained below, a distance traveled by the ball from the second to the third horizontal sensor arrays is calculated in three dimensions. Also the three-dimensional distance traveled by the ball from the second horizontal sensor array to the vertical sensor array is calculated. Of course, it is possible to calculate from the binary data a time consumed while it travels from the second horizontal sensor array to the third horizontal sensor array, and from the second horizontal sensor array to the vertical sensor array.

Below, an equation for calculating ball speed of an iron shot is given.

$$T = n/f \qquad \text{Equation 2}$$
$$BallSpeed = \frac{S}{T}$$

Here, T is a time, f is a sampling frequency, n is a difference in the number of data arrangements with respect to a ball blocking each sensor as it passes the sensors, and S is the distance traveled in a three-dimensional space until the ball is sensed by each sensor (that is, a distance from a space where the ball is sensed by the second horizontal sensor array to a space where the ball is sensed by the third horizontal sensor array or a distance from a space where the ball is sensed by the second horizontal sensor array to a space where the ball is sensed by the vertical sensor array).

The following is an equation for calculating club head speed.

$$T = n/f \qquad \text{Equation 3}$$
$$BallSpeed = \frac{S}{T}$$

Here, T is a time, f is a sampling frequency, n is a club head silhouette block index difference as the club head passes each sensor, and S is a three-dimensional distance traveled by the club head as it passes each sensor. Further, S is calculated by using a distance between the respective sensors and an angle when the club passes each sensor.

The control unit 110 uses the ball silhouette data detected by the third horizontal sensor array 102c and the vertical sensor array 104 to derive the directional angle of the ball and its launch angle.

The method of deriving the directional and launch angles of the ball will be described with reference to FIG. 6.

The directional angle of the ball can be detected when the ball passes the third horizontal sensor array 102, and the launch angle of the ball can be derived when the ball passes the vertical sensor array 104. Here, even when the height of a ball detected by the vertical sensor array 104 (which receives an input from the laser 150) is the same, its launch angle varies depending on its lateral position, so that the directional angle collected by the third horizontal sensor array 102c must be used to determine the launch angle.

Furthermore, in the case of a tee shot, the position and distance of a ball in a space varies according to the height of a tee, so that the height of the tee must be entered so as to be reflected to the coordinates in space.

Referring to FIG. 6, the ball that was on the tee is struck and passes through a light layer and a laser layer. As the ball passes through the light layer, a silhouette thereof is formed at point A at the third horizontal sensor array 102c, and the ball's central point is derived from the silhouette.

Then, a first line is formed to link the central point A of the ball and the laser or light source installed thereabove. Likewise, when the ball passes the laser layer, a point B is formed, and the central point of the ball is derived from the silhouette of the ball.

A second line is formed to ink the central point B of the ball and the laser installed to the rear thereof in three-dimensional space. The first and second lines do not intersect within the space.

Thus, the position of the ball on the first and second lines can be determined from the silhouette data of the ball formed at the third horizontal sensor array 102c and the silhouette data of the ball formed at the vertical sensor array 104. Accordingly, in the case of a tee shot, the height of the tee is inputted so as to determine the launching position of the ball. In the case of an iron shot, the launch position of the ball is automatically determined, because the shot is performed in a designated position.

The following equations apply when describing three-dimensional ball movements in terms of three-dimensional vectors.

$P=(Px,Py,Pz)$:

spatial coordinates where the ball is located for the first time (the position of the ball in the case of a tee shot or iron shot)

$A=(Ax,Ay,Az)$:

the center point (at point A) of the ball silhouette of the third horizontal sensor array $B=(Bx,By,Bz)$:

the center point (at point B) of the ball silhouette of the vertical sensor array $L=(Lx,Ly,Lz)$:

spatial coordinates of the laser installed to the rear $M=(Mx,My,Mz)$:

spatial coordinates of the light source installed in the upper portion $l_1$ (the first line): the equation of the straight line connecting points A and M

$$l_1 : \frac{x - A_x}{M_x - A_x} = \frac{y - A_y}{M_y - A_y} = \frac{z - A_z}{M_z - A_z}$$

$l_2$ (the second line): the equation of the straight line connecting points B and L $$l_2 : \frac{x - B_x}{L_x - B_x} = \frac{y - B_y}{L_y - B_y} = \frac{z - B_z}{L_z - B_z}$$

Now, a position vector passing from a launching point P of the ball through an arbitrary point on the first line will be derived.

$\vec{X} = \overrightarrow{PA} + t\overrightarrow{AM}$ $(0 \leq t \leq 1)$
$= (\alpha_1 t + \alpha_2, \beta_1 t + \beta_2, \gamma_1 t + \gamma_2)$ Here, t is a value between 0 and 1. When t=0, $\vec{X} = \overrightarrow{PA}$, and when t=1, $\vec{X} = \overrightarrow{PM}$.

When t is a value between 0 and 1, it lies on the first line connecting points A and M. Further, points M and P are fixed points in space, and point A calculated from silhouette data also has a value, so that

$\alpha_1, \alpha_2, \beta_1, \beta_2, \gamma_1, \gamma_2$ are all constants, and the respective coordinates for $\vec{X}$ can be linearly expressed in terms of t.

Similarly, a position vector from the launching point P of the ball through an arbitrary point on the second line can be derived.

$\vec{Y} = \overrightarrow{PL} + s\overrightarrow{LB}$ $(0 \leq s \leq 1)$
$= (\delta_1 s + \delta_2, \epsilon_1 s + \epsilon_1, \zeta_1 s + \zeta_2)$ Here, s is a value between 0 and 1. When s=0, $\vec{Y} = \overrightarrow{PL}$, and when s=1, $\vec{Y} = \overrightarrow{PB}$.

When s is a value between 0 and 1, it is a point that lies on the second line connecting points L and B. Further, points L and P are fixed points in space, and point B derived from the silhouette data also has a value, so that $\delta_1, \delta_2, \epsilon_1, \epsilon_2, \zeta_1, \zeta_2$ are all constants, and $\vec{Y}$ can be linearly expressed in terms of s.

The first and second lines do not intersect in space, but because the ball travels in one direction, the directions of vectors $\vec{X}$ and $\vec{Y}$ must be aligned. That is, the two vectors must be parallel.

$\vec{X} = k\vec{Y}$ $(\alpha_1 t + \alpha_2, \beta_1 t + \beta_2, \gamma_1 t + \gamma_2) = k(\delta_1 s + \delta_2, \epsilon_1 s + \epsilon_2, \zeta_1 s + \zeta_2)$ In the above equations,
$\alpha_1, \alpha_2, \beta_1, \beta_2, \gamma_1, \gamma_2, \gamma_1, \gamma_2, \delta_1, \delta_2, \epsilon_1, \epsilon_2, \zeta_1, \zeta_2$
are constants derived from silhouette data at points A and B, and t, s, and k are variables. Three equations can be derived from the vector coordinates x, y, and z of the above vector equation, so that the variables t, s, and k can be solved.

Vectors $\vec{X}$ and $\vec{Y}$ can thus be derived. That is, the traveling direction of the ball within three dimensions can be derived. The sizes of the drawn vectors are proportional to their relative importance. The ball's directional angle (laterally) and its launch angle (in terms of altitude) are calculated from the values of the directional vectors.

A method of determining a ball quality will now be described with reference to FIGS. 7 through 15.

The control unit 110 interprets the digital data (silhouette detection data) that is continuously fed from the horizontal sensor array 102, and determines a ball quality.

The launching direction of the ball is perpendicular to the club face upon impact with the club. The points of silhouette data detected by the components of the horizontal sensor array 102 are connected to draw only a circle of a swing path along the edge of the club, in order to obtain the lean of a tangent against the arc of the swing upon impact.

The path of the drawn circle is the swing path of the golfer. After the lean of the path is obtained at each point of movement, it is determined whether the path of the head is an outside-inside, an inside-inside, or an inside-outside path.

Figure 7:
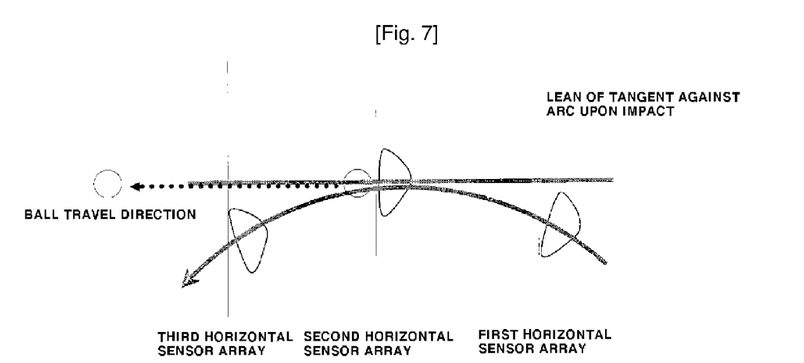
FIGS. 7 through 15 are diagrams for explaining a method of determining a ball quality according to the present invention.

FIG. 7 shows no lean of a tangent against the arc of a swing upon impact, so that the swing is interpreted as a straight swing without any side spin.

Figure 8:
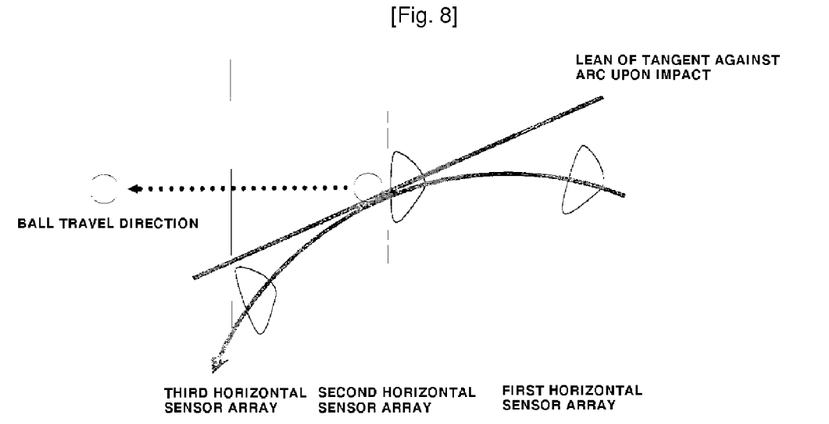

FIG. 8 shows a lean of a tangent against the arc of a swing upon impact, where the lean is to the left of the ball (determined as a slice shot).

Figure 9:
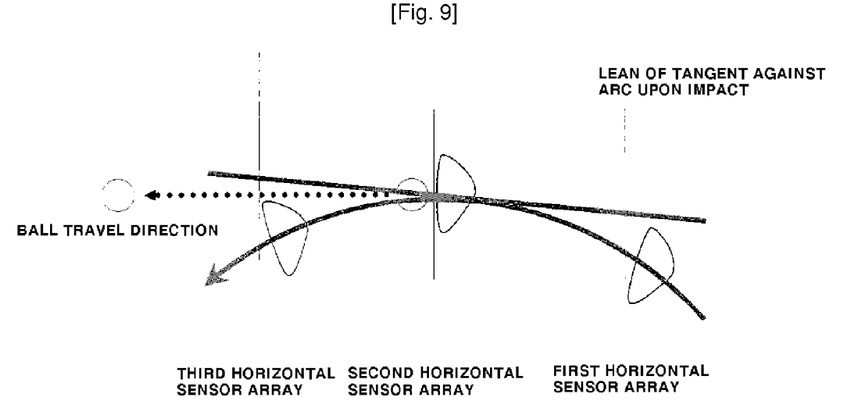

FIG. 9 shows a lean of a tangent against the arc of a swing upon impact, where the lean is to the right of the ball (determined as a hook shot).

Figure 10:
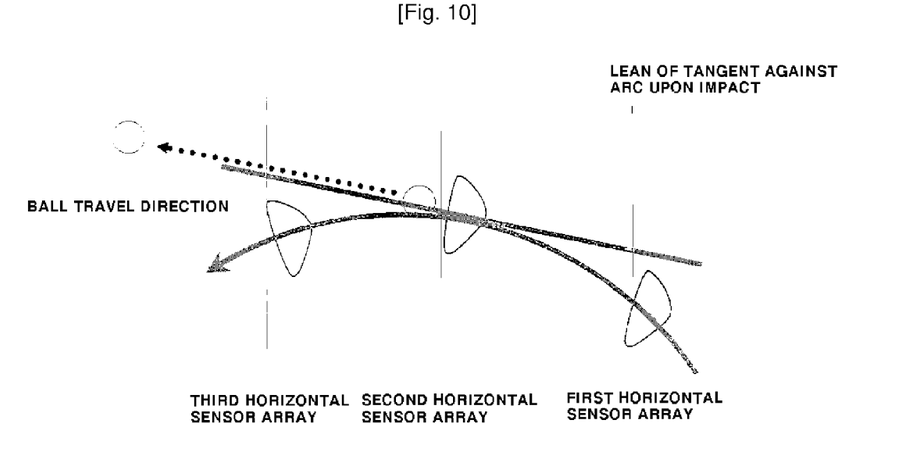

FIG. 10 shows the launching direction of the ball being to the right and no lean of a tangent against the arc of the swing upon impact so that there is no side spin (determined as a push straight shot).

Figure 11:
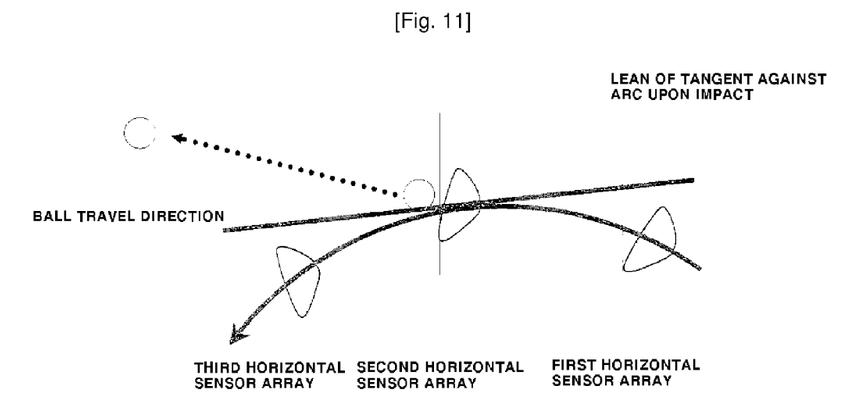

FIG. 11 shows the launching direction of the ball being to the right and a lean of a tangent against the arc of the swing upon impact, where the lean is to the left of the ball, for obtaining a push slice.

Figure 12:
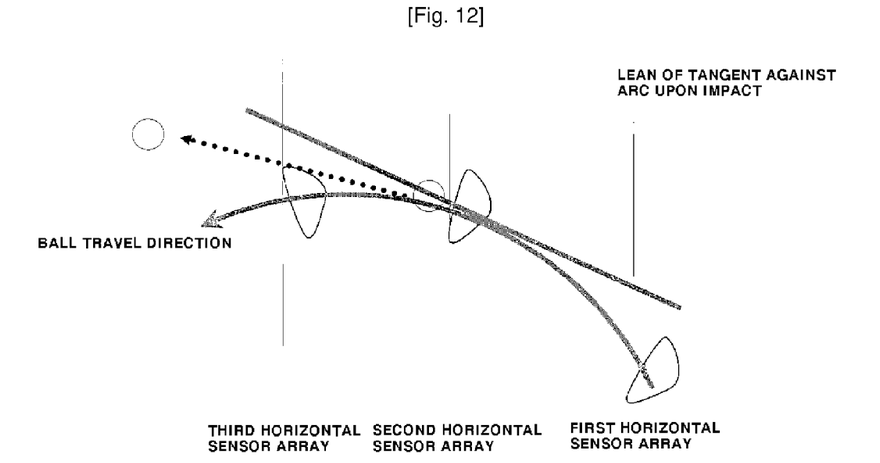

FIG. 12 shows the launching direction of the ball being to the right and a lean of a tangent against the arc of the swing upon impact, where the lean is to the right of the ball (determined as a push hook shot).

Figure 13:
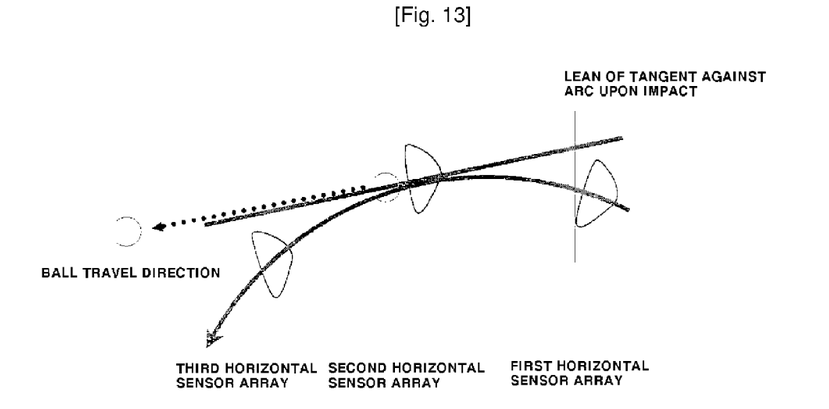

FIG. 13 shows the launching direction of the ball being to the left and no lean of a tangent against the arc of the swing upon impact (determined as a pull straight shot).

Figure 14:
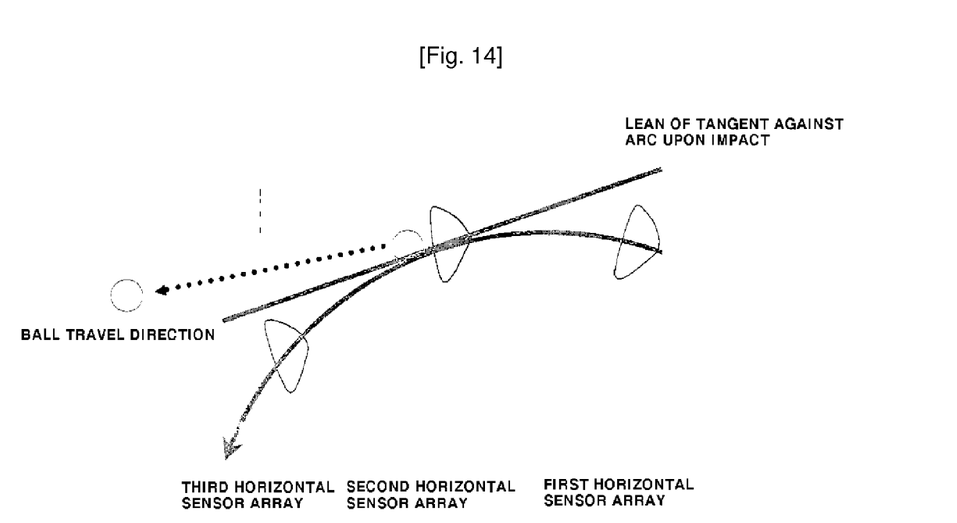

FIG. 14 shows the launching direction of the ball being to the left and a lean of a tangent against the arc of the swing upon impact, where the lean is to the left of the ball (determined as a pull slice shot).

Figure 15:
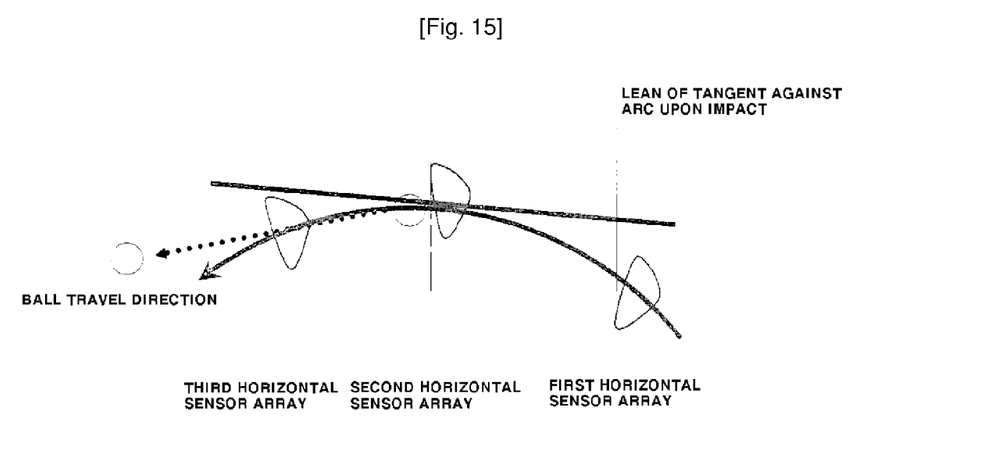

FIG. 15 shows the launching direction of the ball being to the left and a lean of a tangent against the arc of the swing upon impact, where the lean is to the right of the ball (determined as a pull hook shot).

The control unit 110 takes into account the determined ball speed, club head speed, ball direction and launch angles, club approach path, etc., in order to calculate the flight path of the ball.

Thus, the flight path=f(ball speed, club head speed, directional angle, launch angle, club head path).

The control panel 110 uses detected silhouette data provided by the horizontal sensor array 102 and the vertical sensor array 104 to calculate ball speed, club head speed, club head path, flight path, etc.

The display unit 120 displays swing analysis data including the ball speed, club head speed, directional angle, launch angle, and club head path obtained by the control unit 110 on a screen or an FND at a golf practice range.

The data output unit 130 records the swing analysis data calculated by the control unit 110 on a predetermined recording medium. Here, the data output unit 130 may be substituted for with a regular printer.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

The invention claimed is:

1. An analysis system of golf ball and club head data using lasers and 4-axis light sensing, the analysis system comprising:

a horizontal sensor array installed on a floor and including a plurality of light sensors arranged in straight lines a predetermined distance apart from each other, the horizontal sensor array receiving light from a light source installed thereabove so as to detect the silhouette of a golf ball or a club head according to movements of the golf ball or club head;

a vertical sensor array installed to protrude from the floor at a perpendicularly offset angle, the vertical sensor array receiving a laser beam from a laser installed to the rear thereof so as to detect the silhouette of the golf ball when the golf ball passes through the laser beam;

a control unit deriving position coordinates of the golf ball in space using data of the silhouette of the golf ball detected by the horizontal and vertical sensor arrays, and calculating ball speed, club head speed, a ball directional angle, a ball launch angle, a club head path, a ball quality, and a flight distance, using the position coordinates of the golf ball; and a display unit displaying the calculated values on a screen according to the control of the control unit, wherein the horizontal sensor array is composed of a first horizontal sensor array having a predetermined number of light sensors arranged in a predetermined number of rows, a second horizontal sensor array spaced a predetermined distance from the first horizontal sensor array and having a predetermined number of light sensors arranged in a predetermined number of rows, and a third horizontal sensor array spaced a predetermined distance from the second horizontal sensor array and having a predetermined number of light sensors arranged in a predetermined number of rows, the horizontal and vertical sensor arrays indicate regions in which a silhouette is detected as '1' and regions in which a silhouette is not detected as '0', the club head path is calculated using first to third silhouette data of the club head detected by the first to third horizontal sensor arrays so that an imaginary arc passing the first to third club head silhouettes is obtained, and a curvature of the arc is calculated so as to determine the trajectory of the club head before and after an impact of the club head with the golf ball, and the ball quality is obtained by deriving a lean of a tangent against the imaginary arc and is determined using the lean of the tangent and the launching direction of the golf ball.

2. The analysis system according to claim 1, wherein the ball speed is calculated using a distance, where the golf ball covers while moving three-dimensionally past each of the sensor arrays, over a time.

3. The analysis system according to claim 2,
wherein the time is calculated using a golf ball silhouette block index difference when the golf ball passes each of the sensor arrays, divided by a sampling frequency.

4. The analysis system according to claim 1,
wherein the club head speed is calculated using a distance, where the club head covers while moving three-dimensionally past each of the sensor arrays, over a time.

5. The analysis system according to claim 4,
wherein the time is calculated using a club head silhouette block index difference when the club head passes each sensor array, divided by a sampling frequency.

6. The analysis system according to claim 1,
wherein the directional angle of the ball is calculated using the position of the ball silhouette detected by the third horizontal sensor array.

7. The analysis system according to claim 6,
wherein the launch angle of the golf ball is calculated by deriving coordinates of the silhouette of the golf ball detected by the third horizontal sensor array and coordinates of the silhouette of the golf ball detected by the vertical sensor array, deriving a linear equation for a straight line connecting the laser to coordinates of the silhouette of the golf ball detected by the vertical sensor array, substituting the ball silhouette coordinates detected by the third horizontal sensor array into the derived linear equation so as to derive the position coordinates of the ball, and using the position coordinates to calculate the launch angle.

8. The analysis system according to claim 7, wherein the ball silhouette coordinates detected by the third horizontal sensor array and the ball silhouette coordinates detected by the vertical sensor array are respective position coordinates of a specific light sensor, and are derived using the position coordinates.

9. The analysis system according to claim 1, wherein the flight distance is calculated using the ball speed, the club head speed, the directional angle, the launch angle, and the club head path.

\* \* \* \* \*